United States Patent
Lee et al.

(10) Patent No.: US 9,957,930 B2
(45) Date of Patent: May 1, 2018

(54) APPARATUS AND METHOD FOR CHARGING LPG FUEL VEHICLE

(71) Applicant: Hyundai Motor Company, Seoul (KR)

(72) Inventors: Jae Min Lee, Chungcheongnam-do (KR); Jae Hwa Park, Gyeonggi-do (KR); Jong Ki Kim, Gyeonggi-do (KR); Chang Han Kim, Gwangju (KR)

(73) Assignee: Hyundai Motor Company, Seoul (KR)

( * ) Notice: Subject to any disclaimer, the term of this patent is extended or adjusted under 35 U.S.C. 154(b) by 126 days.

(21) Appl. No.: 15/213,656

(22) Filed: Jul. 19, 2016

(65) Prior Publication Data

US 2017/0122272 A1    May 4, 2017

(30) Foreign Application Priority Data

Nov. 2, 2015 (KR) .................. 10-2015-0152983

(51) Int. Cl.
| | |
|---|---|
| *F02M 21/02* | (2006.01) |
| *F02M 37/00* | (2006.01) |
| *G05D 16/20* | (2006.01) |
| *F16K 31/06* | (2006.01) |
| *F02D 19/02* | (2006.01) |

(52) U.S. Cl.
CPC ....... *F02M 37/0076* (2013.01); *F02D 19/022* (2013.01); *F02D 19/027* (2013.01); *F02M 21/0218* (2013.01); *F02M 21/0221* (2013.01); *F02M 21/0239* (2013.01); *F02M 37/007* (2013.01); *F02M 37/0023* (2013.01); *F16K 31/06* (2013.01); *G05D 16/2013* (2013.01)

(58) Field of Classification Search
CPC ........... F02M 21/0218; F02M 21/0221; F02M 21/0239; F02M 21/0242; F02M 37/0023; F02M 37/0076; F02B 43/00; F02B 43/12; F02D 19/022; F02D 19/027; F02D 19/028
USPC .................................... 123/527, 529
See application file for complete search history.

(56) References Cited

U.S. PATENT DOCUMENTS

| | | | | |
|---|---|---|---|---|
| 5,447,142 | A * | 9/1995 | Bailey ............... | F02M 21/0221 123/27 GE |
| 8,919,325 | B2 * | 12/2014 | Pursifull ........... | F02M 21/0239 123/198 D |
| 9,464,761 | B2 * | 10/2016 | Nagura ................. | F17C 13/025 |

(Continued)

FOREIGN PATENT DOCUMENTS

| | | |
|---|---|---|
| JP | 2007-309375 A | 11/2007 |
| KR | 2004-0024194 A | 3/2004 |

(Continued)

*Primary Examiner* — Erick Solis
(74) *Attorney, Agent, or Firm* — Mintz Levin Cohn Ferris Glovsky and Popeo, P.C.

(57) ABSTRACT

An apparatus and a method for charging an LPG fuel vehicle are provided to charge a LPG tank with LPG fuel by decreasing part of pressure in the LPG tank when pressure in the LPG tank, which stores the LPG fuel, is greater than charging pressure. That is, pressure in the LPG tank is decreased to be equal to or lower than charging pressure of a charger and the LPG tank with LPG fuel is charged more smoothly from the charger, by capturing part of the LPG fuel in the LPG tank and allowing the LPG fuel to be combusted in the engine when pressure in the LPG tank of the vehicle is greater than LPG charging pressure of the charger.

11 Claims, 2 Drawing Sheets

(56) References Cited

U.S. PATENT DOCUMENTS

2011/0314839 A1* 12/2011 Brook .................... F02M 21/06
                                                                    62/49.1
2015/0315949 A1* 11/2015 Jansson .................... F17C 5/02
                                                                    123/2
2016/0017835 A1*  1/2016 Garner .................... F17C 5/007
                                                                    123/458
2016/0348605 A1* 12/2016 Perko ................. F02M 21/0215

FOREIGN PATENT DOCUMENTS

| KR | 2004-0057446 A    | 7/2004 |
|----|-------------------|--------|
| KR | 2007-0044685 A    | 4/2007 |
| KR | 2007-0044885 A    | 5/2007 |
| KR | 2009-0016034 A    | 2/2009 |
| KR | 10-2009-0032794 A | 4/2009 |
| KR | 2013-0065023 A    | 6/2013 |
| KR | 2013-0065026 A    | 6/2013 |
| KR | 10-2013-0080373 A | 7/2013 |
| KR | 10-1438967 B1     | 9/2014 |

* cited by examiner

APPARATUS AND METHOD FOR CHARGING LPG FUEL VEHICLE

CROSS-REFERENCE TO RELATED APPLICATION

This application claims under 35 U.S.C. § 119(a) the benefit of Korean Patent Application No. 10-2015-0152983 filed on Nov. 2, 2015, the entire contents of which are incorporated herein by reference.

BACKGROUND (a) Technical Field

The present disclosure relates to an apparatus and a method for charging a liquefied petroleum gas (LPG) fuel vehicle, and more particularly, to an apparatus and a method for charging an LPG fuel vehicle capable of more easily charging an LPG tank with LPG fuel by decreasing part of pressure in the LPG tank when pressure in the LPG tank, which stores the LPG fuel, is greater than charging pressure.

(b) Background Art

In general, as illustrated in FIG. 1, a process of charging an LPG fuel vehicle includes operating a charging pump 2 of an LPG fuel station, supplying LPG fuel through a charger 3 from an LPG reservoir 1 of the LPG fuel station by operating the charging pump 2, and charging an LPG tank of a vehicle with the LPG fuel by LPG charging pressure of the charger 3.

However, the LPG fuel may not be charged since pressure in the LPG tank of the vehicle is greater than the LPG charging pressure when an outside temperature is rapidly increased during warmer weather temperatures. For example, when an atmospheric temperature is about 40° C. or greater during a hot weather season, pressure (e.g., about 16.5 bar) in the LPG tank of the vehicle is increased to be equal to or greater than LPG charging pressure of the charger (e.g., 16.3 bar=pressure of 8.3 bar in the LPG reservoir of the LPG fuel station+LPG pumping pressure of 8.0 bar caused by an operation of the charging pump), and as a result, the LPG tank may not be capable of being charged with the LPG fuel from the charger.

The above information disclosed in this section is merely for enhancement of understanding of the background of the invention and therefore it may contain information that does not form the prior art that is already known in this country to a person of ordinary skill in the art.

SUMMARY

The present invention provides an apparatus and a method for charging an LPG fuel vehicle capable of decreasing pressure in the LPG tank to charging pressure or less of a charger and smoothly charging the LPG tank with LPG fuel from the charger, by capturing part of the LPG fuel in the LPG tank and allowing the LPG fuel to be combusted in the engine when pressure in the LPG tank of the vehicle is greater than LPG charging pressure of the charger.

In one aspect, the present invention provides an apparatus for charging an LPG fuel vehicle that may include: a solenoid valve mounted to be opened and closed on a LPG tank for an LPG vehicle; a venting line that connects an outlet of the solenoid valve and a combustion chamber of an engine; a pressure detecting sensor configured to detect pressure in the LPG tank; and a controller configured to operate the solenoid valve to temporarily open the solenoid valve and operate the engine to temporarily start the engine to supply LPG fuel in the LPG tank to the engine, when pressure in the LPG tank is equal to or greater than charging pressure of a charger based on the detection result of the pressure detecting sensor.

In an exemplary embodiment, an electric door, opened by the controller when pressure in the LPG tank is decreased to be equal to or less than charging pressure of a charger, may be mounted in an inlet of a charging port connected with the LPG tank through a charging pipe. In addition, a door opening detecting sensor, configured to detect an open state of the electric door, may be further mounted in the inlet of the charging port. The pressure detecting sensor may be mounted on a regulator configured to adjust pressure of fuel being supplied to the engine from the LPG tank. The apparatus may further include a cluster configured to provide an alert regarding a fuel filling standby state until pressure in the LPG tank becomes equal to or less than the charging pressure of the charger.

In another aspect, the present invention provides a method of charging an LPG fuel vehicle which may include: detecting pressure in a LPG tank in which LPG fuel is stored; adjusting pressure in the LPG tank to charging pressure or less of a charger by temporarily supplying the LPG fuel in the LPG tank to an engine and combusting the LPG fuel by starting the engine when pressure in the LPG tank is equal to or greater than charging pressure of a charger; and operating an electric door of a charging port to open the electric door to charge the LPG tank with the LPG fuel when pressure in the LPG tank is decreased to be equal to or less than the charging pressure of the charger.

The method may further include detecting an open state of the electric door by a door opening detecting sensor mounted in the charging port to determine whether the electric door breaks down. In addition, the method may further include providing an alert regarding a fuel filling standby state until pressure in the LPG tank becomes equal to or less than the charging pressure of the charger.

Through the aforementioned technical solutions, the present invention provides the effects below.

According to the present invention, when LPG pressure in the LPG tank of the vehicle is increased to be greater than the LPG charging pressure of the charger under a condition in which an exterior temperature is rapidly increased during, for example, the hot season (summer), part of the LPG fuel in the LPG tank is allowed to be combusted in the engine, to decrease pressure in the LPG tank to be equal to or less than the charging pressure of the charger, and as a result, the LPG tank may be charged more smoothly with the LPG fuel from the charger.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
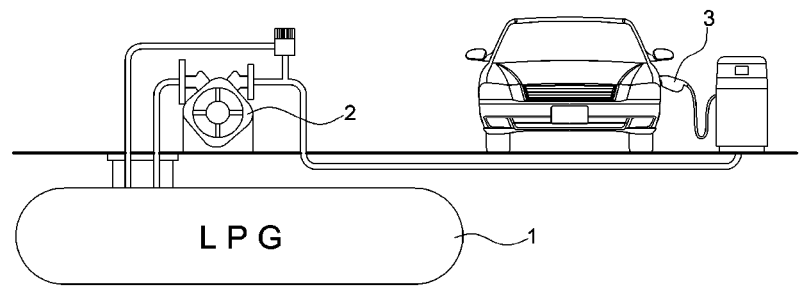
FIG. 1 is a schematic view illustrating a process of charging an LPG fuel vehicle according to the related art.

Reference numerals set forth in the Drawings include reference to the following elements as further discussed below:

- 10: LPG tank
- 12: fuel pump
- 14: regulator
- 15: pressure detecting sensor
- 16: charging pipe
- 18: charging port
- 20: solenoid valve
- 22: venting line
- 24: controller
- 26: electric door
- 28: door opening detecting sensor
- 30: engine It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

Figure 2:
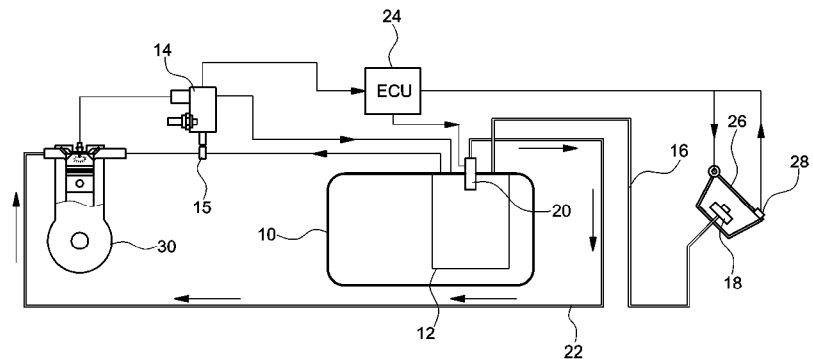
FIG. 2 is a configuration diagram illustrating an apparatus for charging an LPG fuel vehicle according to an exemplary embodiment of the present invention.

Hereinafter, exemplary embodiments of the present invention will be described in detail with reference to the accompanying drawings. The attached FIG. 2 is a configuration diagram illustrating an apparatus for charging an LPG fuel vehicle according to the present invention. In FIG. 2, reference character 10 indicates a LPG tank filled with and configured to store LPG fuel, and reference character 30 indicates an engine for an LPG vehicle. Particularly, the LPG tank 10 (e.g., bombe) is a device configured to receive LPG fuel and may be alternatively referred to as a "bombe" or an LPG reservoir or receptacle.

A fuel pump 12, configured to supply the LPG fuel to the engine 30, may be installed in the LPG tank 10, and a regulator 14, configured to adjust fuel supply pressure constantly, may be mounted in a fuel supply line which connects the LPG tank 10 and the engine 30. A charging pipe 16 may be connected to the LPG tank 10, and a charging port 18, into which a charger of an LPG fuel station is inserted may be mounted in an inlet of the charging pipe 16. In particular, the regulator 14 may include a pressure detecting sensor 15 configured to detect fuel pressure being supplied from the LPG tank 10, that is, pressure (fuel pressure) in the LPG tank.

A solenoid valve 20 may be openably and closably mounted (e.g., mounted to be opened or closed) in a fuel discharge port of the LPG tank 10. In particular, the solenoid valve 20 may be mounted at an outlet position of the fuel pump 12 mounted in the LPG tank 10. Additionally, a venting line 22, through which the LPG fuel in the LPG tank 10 is supplied when the solenoid valve 20 is opened, may be connected to an outlet of the solenoid valve 20 and a combustion chamber of the engine.

Therefore, when pressure in the LPG tank, detected by the pressure detecting sensor 15, is equal to or greater than charging pressure of the charger (e.g., when LPG pressure in the LPG tank of the vehicle is increased to be greater than the LPG charging pressure of the charger under a condition in which an outside temperature is rapidly increased), the solenoid valve 20 may be temporarily opened by a controller 24, and consecutively, the LPG fuel in the LPG tank 10 may be supplied to the engine through the venting line 22.

In other words, the controller 24 may be configured to receive a detection signal of the pressure detecting sensor 15 and may be configured to operate the solenoid valve 20 to temporarily open the solenoid valve 20 when pressure in the LPG tank is equal to or greater than the charging pressure of the charger, and thus, the LPG fuel in the LPG tank 10 may be supplied to the engine via the opened solenoid valve 20 and the venting line 22. In particular, the controller 24 may be configured to operate the engine to start the engine while the LPG fuel is supplied to the engine. In particular, when the controller 24 transmits a control signal for opening the solenoid valve 20 to a separate engine control unit (ECU) (not illustrated), the engine ECU may be configured to operate the engine to start the engine.

As described above, when pressure in the LPG tank is equal to or greater than the charging pressure of the charger, part of the LPG fuel in the LPG tank may be supplied to the engine to be combusted, and thus, pressure in the LPG tank may be decreased to be equal to or less than the charging pressure of the charger, and as a result, the LPG tank may be charged more smoothly with the LPG fuel from the charger. Meanwhile, an electric door 26, opened by the controller 24 when pressure in the LPG tank is decreased to be equal to or less than the charging pressure of a charger, may be mounted in an inlet of the charging port 18 connected with the LPG tank 10 via the charging pipe 16.

The electric door 26 may be continuously maintained closed in a state in which the LPG fuel is not capable of being charged (e.g., when LPG pressure in the LPG tank of the vehicle is increased to be greater than the LPG charging pressure of the charger under a condition in which an outside temperature is rapidly increased) and thus, a driver may recognize the state in which the LPG fuel is not capable of being charged, and when pressure in the LPG tank is decreased to be equal to or less than the charging pressure of the charger and the LPG tank may be charged, the electric door 26 may be opened by the controller 24 and thus, the driver may recognize a state in which the LPG tank may be normally charged.

In particular, when the LPG fuel is not capable of being charged, an alert message or the like, which informs the driver of a fuel filling standby state, may be displayed using a cluster (not illustrated) disposed in front of a driver seat until pressure in the LPG tank is decreased to be equal to or less than the charging pressure of the charger and the LPG tank may be charged, to allow the driver to recognize whether the LPG fuel may be charged.

A door opening detecting sensor 28, configured to detect whether the electric door 26 is opened, ma be mounted in the inlet of the charging port 18, and thus the door opening detecting sensor 28 may be configured to determine whether the electric door 26 is opened and whether the electric door 26 breaks down (e.g., fails or malfunctions). In other words, when the door opening detecting sensor 28 is not capable of detecting an opened state of the electric door 26 when the electric door 26 is opened by the controller 24, the controller 24 may be configured to determine that the electric door 26 has failed and operates the cluster to display an alert message or the like, to allow the driver to recognize a breakdown of the electric door 26.

Figure 3:
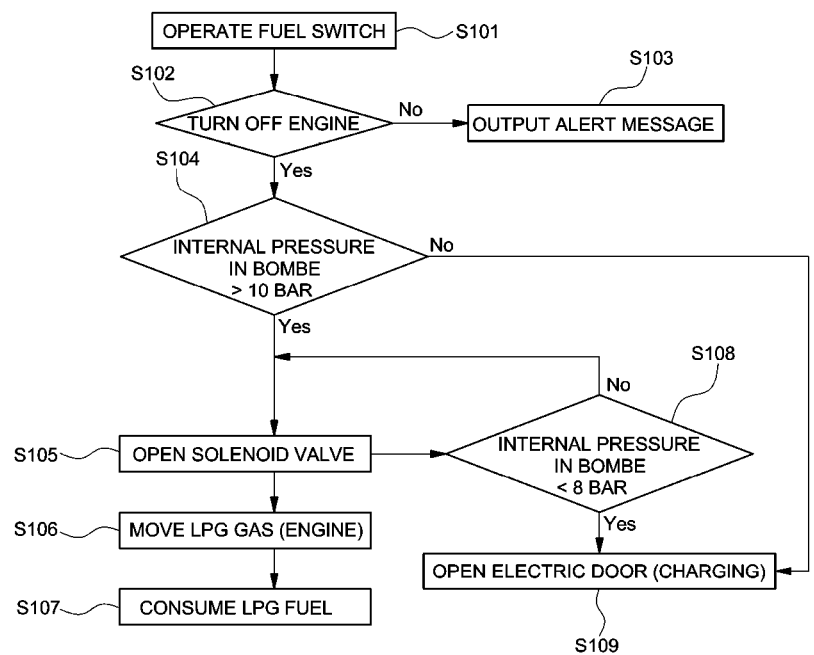
FIG. 3 is a flowchart illustrating a method of charging an LPG fuel vehicle according to an exemplary embodiment of the present invention.

A method of charging a LPG fuel vehicle according to the exemplary embodiment of the present invention, which is based on the aforementioned configurations, will be described below with reference to the attached FIGS. 2 and 3.

First, a charging switch configured to charge the LPG fuel may be operated (S101). Whether the engine is turned on or off may then be determined when the charging switch is operated (S102), and an alert message, providing an alert to a driver to turn off the engine, may be displayed on the cluster when the engine is not turned off (S103), and when the engine is turned off, pressure in the LPG tank for storing the LPG fuel may be detected.

Particularly, the detection of pressure in the LPG tank may be executed by the pressure detecting sensor 15 included in the regulator 14 configured to adjust fuel supply pressure. In other words, the pressure detecting sensor 15 may be configured to detect LPG fuel pressure, which may be supplied from the LPG tank 10 to the regulator 14, as internal pressure in the LPG tank when an inlet side of the regulator 14 is in communication with an interior of the LPG tank 10. Subsequently, the controller 24 may be configured to receive pressure in the LPG tank detected by the pressure detecting sensor 15, and compare pressure in the LPG tank with reference pressure (e.g., charging pressure of about 10 bar of the charger provided in the LPG fuel station) (S104).

As a result of the comparison, in response to determining that pressure in the LPG tank is equal to or greater than the charging pressure of the charger, the solenoid valve 20 may be opened by a control command of the controller 24 (S105). Therefore, since the solenoid valve 20 may be opened, the LPG fuel in the LPG tank 10 may be supplied to the engine through the venting line 22 (S106), and the LPG fuel supplied to the engine may be combusted and consumed as the engine starts (S107). Since part of the LPG fuel in the LPG tank may be supplied to the engine and combusted as described above, it may be possible to decrease pressure in the LPG tank to be equal to or less than the charging pressure of the charger (e.g., about 8 bar or lower). In particular, since the engine start may be performed temporarily to the extent that pressure in the LPG tank is slightly decreased, there is no problem of raising claims such as a risk of fire and excessive consumption of LPG.

Subsequently, whether pressure in the LPG tank is decreased to be equal to or less than the charging pressure of the charger may be determined (S108), and the electric door 26 of the charging port 18 may be opened by the controller 24 when pressure in the LPG tank is equal to or less than the charging pressure of the charger (S109), and thus, the charger may be inserted into the charging port 18 and the LPG tank may be charged more smoothly with the LPG fuel. Meanwhile, an alert may be provided regarding a fuel filling standby state until pressure in the LPG tank becomes equal to or less than the charging pressure of the charger.

As described above, an alert message or the like, which informs the driver of a fuel filling standby state, may be displayed using the cluster (not illustrated) disposed in front of the driver seat until pressure in the LPG tank is decreased to be equal to or less than the charging pressure of the charger and the LPG tank may be charged, and thus, the driver may recognize whether the LPG fuel may be charged.

Further, to determine whether the electric door 26 fails, the door opening detecting sensor 28 mounted in the charging port 18 may be configured to detect an opened state of the electric door. For example, when the door opening detecting sensor 28 is not capable of detecting an opened state (e.g., the detected state is closed) of the electric door 26 when the electric door 26 may be operated to be opened by the controller 24, the controller 24 may be configured to determine that the electric door 26 fails and may be configured to operate the cluster to display an alert message or the like, to allow the driver to recognize a breakdown of the electric door 26.

As described above, when LPG pressure in the LPG tank of the vehicle is increased to be greater than the LPG charging pressure of the charger under a condition in which an outside temperature is rapidly increased, part of the LPG fuel in the LPG tank may be allowed to be combusted in the engine and pressure in the LPG tank may be decreased to be equal to or less than the charging pressure of the charger, and as a result, the LPG tank may be charged more smoothly with the LPG fuel from the charger. Consequently, it may be possible to solve a problem in the related art in that the LPG fuel is not capable of being charged since pressure in the LPG tank of the vehicle becomes greater than the LPG charging pressure under a condition in which an outside temperature is rapidly increased in accordance with the hot season.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. An apparatus for charging a liquefied petroleum gas (LPG) fuel vehicle, comprising:
   a solenoid valve openably and closably mounted on a LPG tank for an LPG vehicle;
   a venting line that connects an outlet of the solenoid valve and a combustion chamber of an engine;
   a pressure detecting sensor configured to detect pressure in the LPG tank; and
   a controller configured to operate the solenoid valve to temporarily open the solenoid valve and operate the engine to temporarily start the engine to supply LPG fuel in the LPG tank to the engine, when pressure in the LPG tank is equal to or greater than charging pressure of a charger based on a detection result of the pressure detecting sensor.

2. The apparatus of claim 1, wherein an electric door, opened by the controller when pressure in the LPG tank is decreased to be equal to or less than the charging pressure of the charger, is mounted in an inlet of a charging port connected with the LPG tank via a charging pipe.

3. The apparatus of claim 1, wherein a door opening detecting sensor, configured to detect an opened state of the electric door, is mounted in the inlet of the charging port.

4. The apparatus of claim 1, wherein the pressure detecting sensor is mounted on a regulator configured to adjust pressure of fuel being supplied to the engine from the LPG tank.

5. The apparatus of claim 1, further comprising:
   a cluster configured to provide an alert regarding a fuel filling standby state until pressure in the LPG tank becomes equal to or less than the charging pressure of the charger.

6. A method of charging a liquefied petroleum gas (LPG) fuel vehicle, the method comprising:
   detecting, by a sensor, pressure in a LPG tank configured to store LPG fuel;
   adjusting, by a controller, pressure in the LPG tank to be equal to or less than charging pressure of a charger by temporarily supplying the LPG fuel in the LPG tank to an engine and combusting the LPG fuel by starting the engine when pressure in the LPG tank is equal to or greater than the charging pressure of the charger; and
   operating, by the controller, an electric door of a charging port to open the electric door to charge the LPG tank with the LPG fuel when pressure in the LPG tank is decreased to be equal to or less than the charging pressure of the charger.

7. The method of claim 6, further comprising:
   detecting, by the controller, an opened state of the electric door by a door opening detecting sensor mounted in the charging port to determine whether the electric door fails.

8. The method of claim 6, further comprising:
   providing, by the controller, an alert regarding a fuel filling standby state until pressure in the LPG tank becomes equal to or less than the charging pressure of the charger.

9. A non-transitory computer readable medium containing program instructions executed by a controller for charging a liquefied petroleum gas (LPG) fuel vehicle, the computer readable medium comprising:
   program instructions that control a sensor to detect pressure in a LPG tank configured to store LPG fuel;
   program instructions that adjust pressure in the LPG tank to be equal to or less than charging pressure of a charger by temporarily supplying the LPG fuel in the LPG tank to an engine and combusting the LPG fuel by starting the engine when pressure in the LPG tank is equal to or greater than the charging pressure of the charger; and
   program instructions that operate an electric door of a charging port to open the electric door to charge the LPG tank with the LPG fuel when pressure in the LPG tank is decreased to be equal to or less than the charging pressure of the charger.

10. The non-transitory computer readable medium of claim 9, further comprising:
    program instructions that detect an opened state of the electric door by a door opening detecting sensor mounted in the charging port to determine whether the electric door fails.

11. The non-transitory computer readable medium of claim 9, further comprising:
    program instructions that provide an alert regarding a fuel filling standby state until pressure in the LPG tank becomes equal to or less than the charging pressure of the charger.

* * * * *